April 13, 1954  A. FORTES  2,674,857
REINFORCEMENT FOR SECTIONS OF EMBEDDED
CONDUITS SUBJECT TO EXTERNAL PRESSURE
Filed Oct. 4, 1948
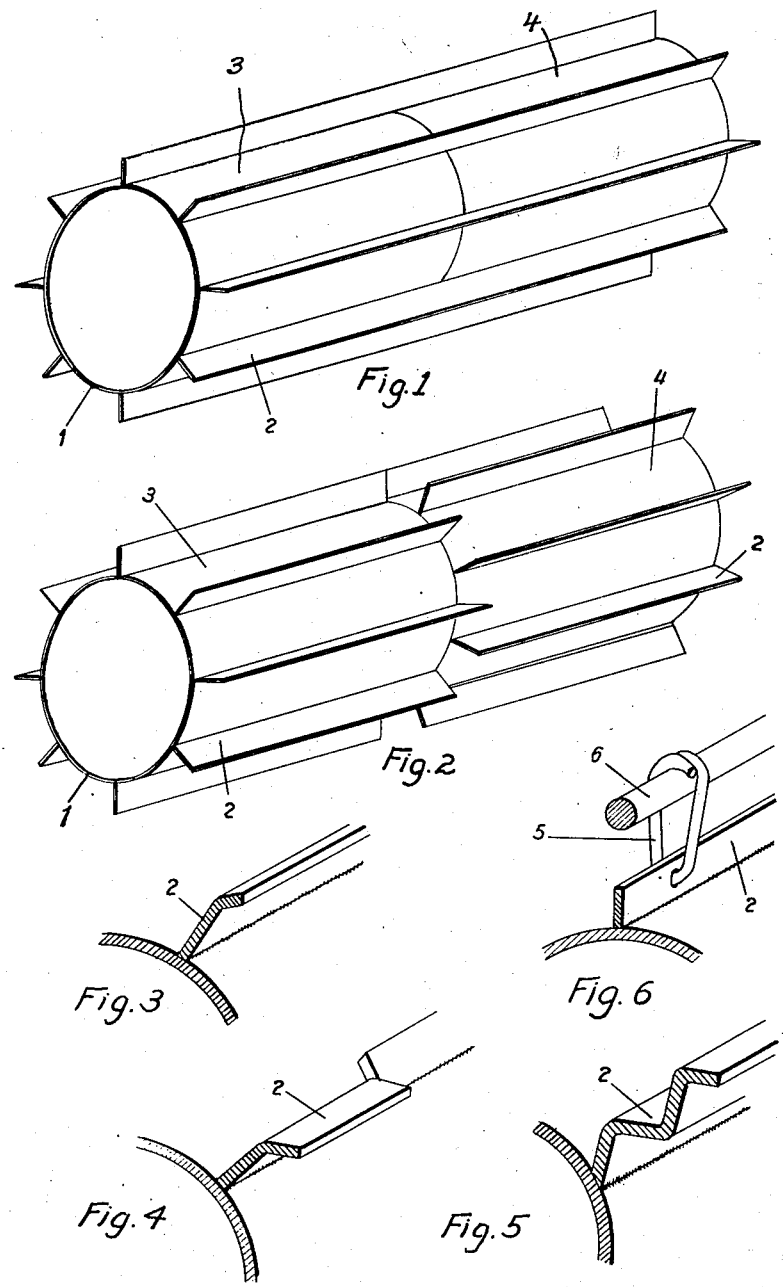
Inventor
Angelo Fortes.

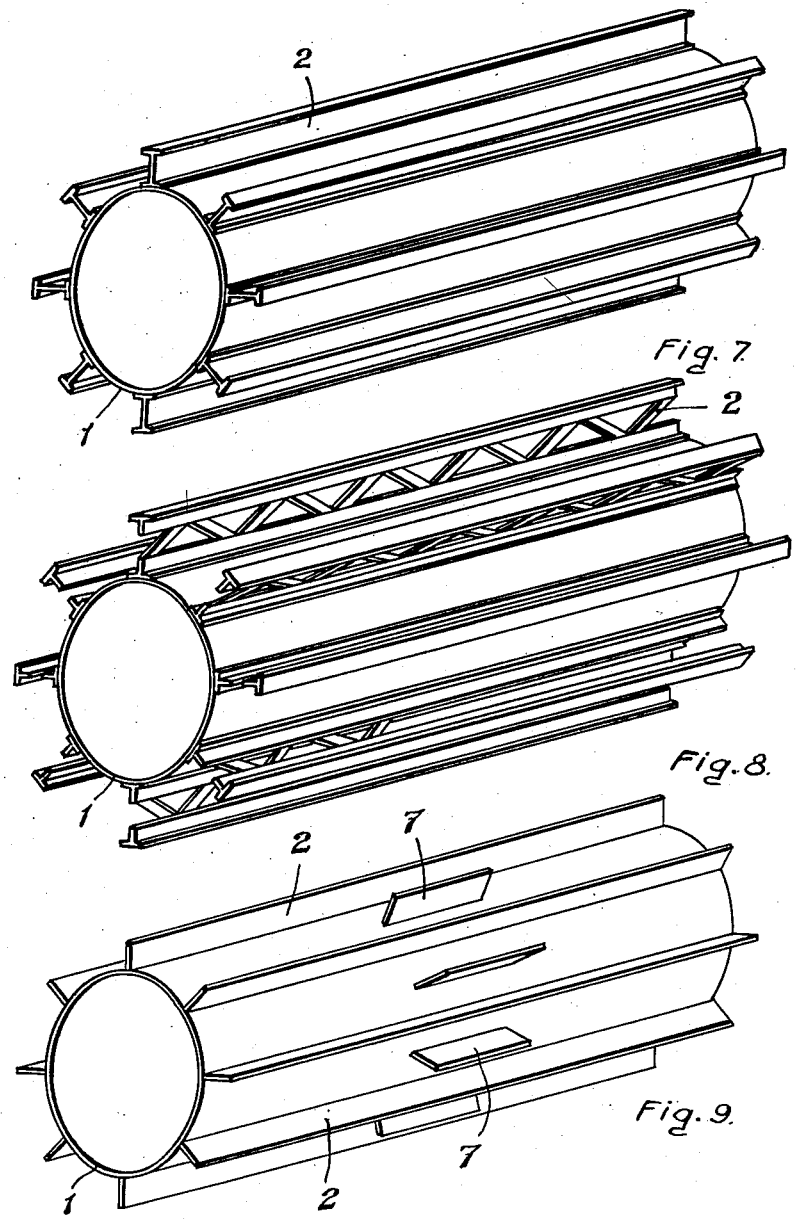

Patented Apr. 13, 1954

2,674,857

UNITED STATES PATENT OFFICE 2,674,857

REINFORCEMENT FOR SECTIONS OF EMBEDDED CONDUITS SUBJECT TO EXTERNAL PRESSURE

Angelo Fortes, Lisbon, Portugal, assignor of one-half to Neyrpic Portuguesa, Limitada, Lisbon, Portugal, a corporation of Portugal Application October 4, 1948, Serial No. 52,656

Claims priority, application Portugal October 9, 1947

11 Claims. (Cl. 61—41)

The invention relates to reinforcements for sections of embedded conduits subject to external pressure.

Conduits which extend through large masses such as water dams are subject to considerable external pressure sometimes known as "sub-pressure" and reinforcing of the conduits is required, particularly where the mass in which the conduit is embedded is a porous mass, as in a dam, or there is a space between the conduit and the mass so that the head race may exert a considerable static pressure on the outer surface of the conduit when it is empty or whenever the internal pressure drops unduly because of a strong increase in the flow or any other hydraulic phenomenon.

The need for reinforcing of such conduits has been recognized but until now the reinforcements have consisted of flat or section iron or circular trussed beams either of metal or concrete extending about the circumference of the conduits or even reinforced concrete circular beams or sheaths. Large numbers of tie rods of different shapes have also been used, fixed to the periphery of the conduit in order to secure it to the surrounding concrete of the dam or the like but all of these reinforcements have been subject to objections arising principally from the inaccuracy of calculations as to their strength, thus making it necessary to adopt high safety factors with consequent increase in the weight of the entire structure and increase in cost. The circumferentially extending reinforcements or the large numbers of tie rods are also subject to the disadvantage that they are difficult to construct and erect and they are therefore unduly expensive.

Accordingly the principal object of the invention is to provide a relatively inexpensive reinforcement for conduits of the type described which is free from the disadvantages referred to above.

More specifically it is an object of the invention to provide a reinforcement for conduits of the type described which dispenses with the circumferentially extending members and avoids the construction and erection difficulties referred to above.

With these and other objects in view the reinforcement according to the invention comprises continuous webs fixed upon the outer surface of the conduit and extending lengthwise thereof, (i. e. along its generatrices) over a single or several sections of conduit.

In most cases, conduits of welded or riveted plates are used, and the reinforcement is welded on to them, in the workshop or on the spot. The reinforcing webs should be of a length at least equal to half the distance between two adjoining webs, measured around the outer circumference of the conduit. Should exceptional strength be desired smaller webs may be welded to the outer surface of the conduit between the larger webs and parallel to the axis of the conduit.

The invention will now be described with reference to the accompanying drawings in which:

Figure I illustrates a conduit having webs formed by flat plates extending in line over more than one section.

Figure II illustrates a conduit having reinforcing webs of the type illustrated in Figure I, staggered on adjacent sections.

Figure III illustrates in detail a web which is bent adjacent its free edge at an angle to the remainder of the web.

Figure IV illustrates a modification of the web according to Figure III.

Figure V illustrates a further embodiment of the invention in which the web is corrugated.

Figure VI illustrates an arrangement in which the web is connected by means of stirrups to rods embedded in the enveloping concrete.

Figure VII illustrates an embodiment of the invention in which the webs are plain beams.

Figure VIII illustrates an embodiment of the invention in which the webs are trussed beams, and Figure IX illustrates an modification of the invention in which smaller webs are provided between the larger webs for exceptional strength.

Referring to Figures I and II, the conduit 1 is provided with the webs 2 extending longitudinally of the conduit and either aligned over adjacent conduit sections 3 and 4, as illustrated in Figure I, or staggered, as illustrated in Figure II. In Figures I and II the webs are flat plates continuously welded along one edge to the outer surface of the conduit. The webs illustrated in Figures III to V are similarly welded along one edge but in Figures III to V are shaped to increase the concrete slip resistance and in Figure VI are connected by stirrups 5 to rods 6 embedded in the enveloping concrete. In Figures VII and VIII the webs are plain and trussed beams, respectively, and in Figure IX, smaller webs 7 are welded or otherwise secured to the outside of the conduit parallel to the axis thereof.

Other embodiments of the invention are contemplated without departing from the main idea of the invention, which consists in placing webs extending longitudinally of the conduit along its outer surface so as to extend continuously throughout at least each section, in contrast to the existing arrangements in which the reinforcing members extend circumferentially and are spaced longitudinally of the conduit.

According to the invention the cross section of the various conduit sections remains constant throughout the entire length of the section, thus simplifying the strength calculations which are reduced to a two dimensional problem and moreover are accurate because no approximations of any sort are required. This simplification and precision in the strength calculations makes it unnecessary to provide for excessive safety factors and thus avoids unnecessary weight and therefore unnecessary expense. At the same time the reinforcing webs are in themselves simple to construct and may be plates currently obtainable in the market and welded in a simple manner to the conduits with welding fillets either in the shop or on the job. Thus the webs themselves are less expensive and they are much less expensive to install, and finally the conduit sections between two consecutive longitudinal reinforcing webs act as arches having their abutments resting on the webs, thus providing a greater resistance to external pressure for a given thickness of conduit wall.

What I claim is:

1. An arrangement for reinforcing conduit to be embedded in concrete or the like and subject to external pressure, comprising a multiplicity of continuous metal webs fixedly positioned upon the outer surface of a cylindrical conduit and extending along generatrices thereof.

2. Reinforcement as claimed in claim 1 in which said webs are flat plates set on edge and extending generally radially from the circumference of the conduit.

3. Reinforcement as claimed in claim 1 in which said webs are corrugated plates set on edge and extending generally radially from the circumference of the conduit.

4. Reinforcement as claimed in claim 1 in which the webs are plain beams.

5. Reinforcement as claimed in claim 1 in which the webs are trussed beams.

6. Reinforcement as claimed in claim 1 in which the length of a web is at least equal to half the distance between two adjoining webs, measured circumferentially of the conduit.

7. An embedded conduit structure subject to external pressure comprising a cylindrical conduit, a plurality of continuous webs fixedly positioned on the outer surface of said conduit and extending along the generatrices thereof, and embedding material surrounding said conduit and webs whereby the external pressure on said conduit will be transmitted through said webs to said embedding material.

8. A conduit structure to be embedded in concrete or the like and subject to external pressure comprising a cylindrical conduit and a plurality of continuous webs fixedly positioned upon the outer surface of the conduit and extending along the generatrices thereof so as to define longitudinally-extending arch-like sections in the conduit therebetween; said webs being plates set on edge and extending generally radially from the circumference of the conduit, said plates being bent adjacent their free edges at an angle to the remainder of the plate so that the bent portions of the plates when embedded in the surrounding concrete form a support for the arch-like sections, whereby the resistance of the conduit to buckling or collapse is greatly increased.

9. A method of reinforcing a conduit for embedding in concrete comprising the steps of welding a plurality of continuous webs on the outer surface of said conduit, extending along the generatrices thereof, and embedding said conduit in concrete.

10. A method of reinforcing a conduit for embedding in concrete comprising the steps of attaching a plurality of continuous webs in an axial direction along the outer surface of said conduit, forming bends along the lengths of said webs, and embedding said conduit in concrete.

11. A method of reinforcing a cylindrical conduit for embedding in concrete comprising the steps of attaching a plurality of continuous webs along the outer surface of said conduit, extending along the generatrices thereof, and embedding said conduit in concrete.

References Cited in the file of this patent

UNITED STATES PATENTS

| Number | Name | Date |
|---|---|---|
| D. 26,842 | Hawley | Mar. 30, 1897 |
| 177,586 | Strecker | May 16, 1876 |
| 813,918 | Schmitz | Feb. 27, 1906 |
| 971,353 | Brayton et al. | Sept. 27, 1910 |
| 1,096,993 | Boyd | May 19, 1914 |
| 2,067,493 | Kinzie | Jan. 12, 1937 |
| 2,236,185 | Murray | Mar. 25, 1941 |
| 2,389,166 | Seaver | Nov. 20, 1945 |

FOREIGN PATENTS

| Number | Country | Date |
|---|---|---|
| 5,164 | Great Britain | Dec. 10, 1880 |
| 688,641 | France | Aug. 27, 1930 |
| 619,435 | Germany | of 1935 |
| 857,557 | France | of 1940 |